Patented Jan. 25, 1938

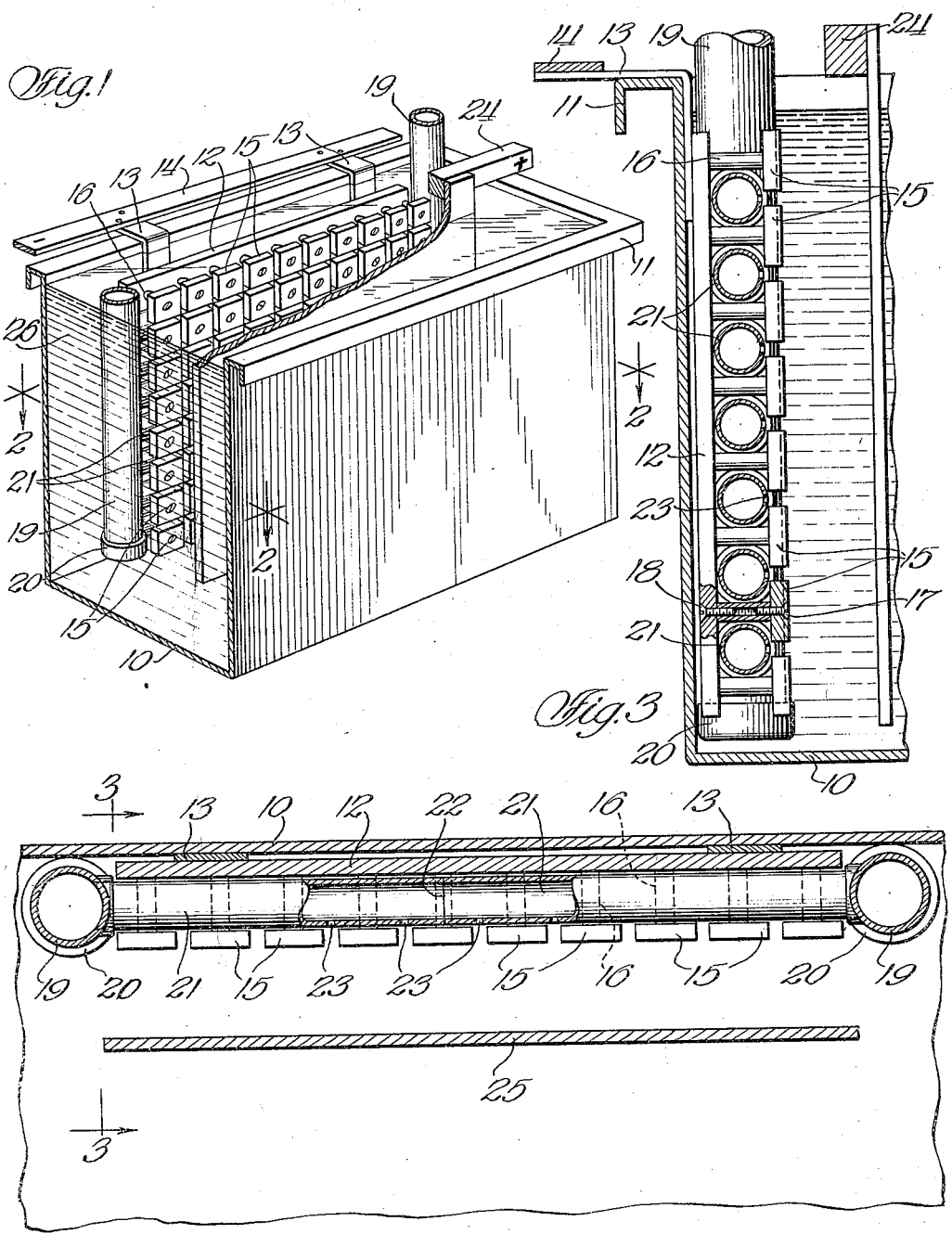

2,106,455

UNITED STATES PATENT OFFICE 2,106,455

APPARATUS FOR ELECTRICAL ETCHING

Joseph Honert, Chicago, Ill.

Application October 14, 1935, Serial No. 44,900

7 Claims. (Cl. 204—5)

The present invention relates to the art of electrical etching and has for its object the provision of an apparatus wherein the action of the electrolyte upon the plate to be etched may be evenly distributed, and wherein the electrolyte may simultaneously be agitated.

A further object of the present invention is the provision of a method and apparatus for electrical etching wherein the cathode may be separated into multiple electrodes uniformly spaced from each other for the purpose of uniformly distributing the action of the electrolyte upon the plate to be etched and whereby at the same time the electrolyte may be agitated, uniformly and directly to and against the plate to be etched for the purpose of removing therefrom dissociated material and to prevent polarization thereof.

A still further object of the present invention is the provision of an electrical etching apparatus wherein the cathode is split into a plurality of identical and uniformly arranged electrodes for the purpose of enhancing and uniformly distributing the action of the electrolyte upon the plate to be etched, and wherein means may be provided co-acting with said cathode for agitating the electrolyte and at the same time for acting upon the plate to be etched for the purpose of removing dissociated material from said plate and to prevent polarization thereof.

A still further object of the present invention is the provision of an apparatus of the character hereinabove indicated and wherein means are provided in combination with the cathode whereby uniformly arranged air streams may be directed against the plate to be etched for the purpose of uniformly agitating the electrolyte so as to increase the electrolytic efficiency of the electrolyte by adding oxygen thereto as well as to dislodge from said plate to be etched any dissociated material and further to prevent polarization of said plate to be etched.

A still further object of the present invention is the provision of means in combination with the cathode whereby uniformly distributed streams of air may be directed into the electrolyte and perpendicularly with respect to the plate to be etched for the purpose of uniformly agitating the electrolyte and consequently to dislodge and remove from the plate to be etched any dissociated material, the product of the electrolytic action, and at the same time for preventing polarization of said plate to be etched.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views, Fig. 1 is a perspective view of the apparatus with one side of the tank thereof removed and with some parts thereof partly broken away;

Fig. 2 is a cross-sectional view on horizontal plane the view having been taken on line 2—2 of Fig. 1; and Fig. 3 is a vertical cross-sectional view through the apparatus on line 3—3 of Fig. 2.

Referring in detail to the present drawing there is shown therein a tank 10 preferably made of electricity non-conducting material such as glass or rubber.

The upper edge of said tank 10 is outwardly flared to provide rim 11.

The cathode part of the apparatus includes a base plate 12 suspended upon brackets 13 which in turn are rigidly connected to a suitable bar 14, constituting the negative conductor, which in turn connects with a suitable source of electric current, such as battery, not shown.

Said cathode further includes a plurality of square plates 15 spaced from said base plate 12 and uniformly spaced from each other. It is understood, however, that I do not desire to limit myself to any particular shape of said plates 15, as obviously said plates 15 may be round or polygonal. However, to obtain best results, said plates 15 should be uniformly spaced from each other.

Said plates 15 are attached to the base plate 12 by means of standards 16, each of which is rigidly attached to and extends from the central portion of plates 15, while the opposite end thereof is rigidly attached to said base plate 12. I do not desire to limit myself to any particular connection of said standards 16 between said plates 15 and base plate 12, and for illustration merely of one means of connection I show on Fig. 3 one of said standards 16 as being a sleeve inwardly threaded to receive from one end thereof a screw 17 passing through the central portion of plates 15, and another screw 18 passing through base plate 12 and entering said sleeve from the opposite end thereof. Obviously, said standards 16 may be solid and may be riveted welded or soldered both to plates 15 and base plate 12.

From the hereinabove description it will be apparent that said plates 15 when in an operative position with respect to said base plate 12 constitute a sort of grid plate, the employment of which in connection with the cathode facilitates the passage of current from the anode more quickly and readily than in the event where cathode is a solid plate. It is a known fact that electric current passing from anode to the cathode through the electrolyte enters more readily at the edges of the cathode than at the solid portions thereof. Thus, when in the instant apparatus the cathode is separated into smaller and uniformly arranged units such as plates 15, each having its distinct edge, the current passing from the anode will more readily and quickly pass to the cathode and thus the action of the current upon the electrolyte will be proportionately increased and this in turn will add to the efficiency of the electrolyte in its action upon the anode which is the plate to be etched. Thus, one of the objects of a multiple cathode, by employment of a plurality of units such as plates 15, is to evenly and more quickly distribute the attack of the electrolyte upon the plate to be etched, so that all portions thereof will be uniformly and simultaneously etched.

Co-operating with the cathode part of the present apparatus hereinabove described is means for supplying air and uniformly blowing the same into the electrolyte and towards the plate to be etched and perpendicularly thereto. This means includes a pair of manifolds 19, shown in the drawing with their upper ends broken away, with their lower ends sealed as at 20. Each of said manifolds 19 is positioned near the opposite vertical ends of base plate 12 and facing the space between plates 15 and said base plate 12. Laterally projecting from each of said manifolds 19 is a plurality of horizontal pipes 21 which are adapted to enter the spaces between the horizontal rows of standards 16 as is clearly seen on Figs. 1 and 3. The free ends of the series of said horizontal pipes 21 which connect with one of said manifolds 19 may freely contact as at 22 with the free ends of the opposite series of said pipes 21 connected to the other manifold 19. Each of said pipes 21 is provided with a plurality of spaced apertures 23. Each of said apertures 23 is in a predetermined position in each of said pipes 21 so that when said pipes 21 are in an operative position with respect to the cathode part of the apparatus, each of said apertures 23 remains in a position centrally of the space made by adjacent corners of each four adjacent plates 15, as is clearly seen on Figs. 2 and 3. Thus it will be apparent that said apertures 23 are evenly and uniformly distributed with respect to the grid plate, the ultimate result of the uniform arrangement of said plates 15 as hereinabove described.

The upper ends of said manifolds 19 may either directly or through the medium of hose connect with an air pump from which the air is forced into said manifolds 19 and from them into pipes 21 and from the latter to be forced into the electrolyte through said apertures 23.

The anode includes rod 24 which is a conductor for positive current and which may connect by any suitable means with an electric source. Said conductor 24 rests upon rim 11 and remains above tank 10 and longitudinally thereof.

Connected by any suitable means to said conductor 24 is the plate to be etched 25.

Obviously, said plate 25 as well as the cathode, including base plate 12, plates 15, constituting grid plate in their ultimate formation, standards 16 and pipes 21 as well as lower portions of manifolds 19 are all immersed in the electrolyte, while conductors 14 and 24 remain above the electrolytic solution.

From the hereinabove description it will be readily seen that when the anode and cathode are immersed in electrolyte, current is passed through conductors 14 and 24, and the air is forced through said apertures 23, there is constant circulation of air, and consequent agitation of electrolyte between said plate 25 to be etched and base plate 12. It is understood that the cathode hereinabove described as well as the plate 25 to be etched, are to be immersed in the electrolyte 26. This constant agitation of the electrolyte between said two plates, has a cleaning action upon the two plates, which prevents polarization upon the plate to be etched, and uniformly acts upon the plate to be etched for the purpose of removing therefrom dissociated material, which in turn precipitates to the bottom of tank 10. In addition air passing through apertures 23 adds oxygen to the electrolyte which increases the effectiveness of the electrolytic action upon the plate to be etched. Since the air passing through said apertures 23 does not disturb the area adjacent the bottom of tank 10, it follows that any sediment precipitated on the bottom will not be disturbed, and consequently the same will not again mix with the electrolyte remaining between plates 12 and 25.

It is also observed that to add to the efficiency of the apparatus manifolds 19 and pipes 21 should be made of non-conducting material.

It is also further observed that there may be several cathodes and several anodes in staggered or alternate relation in one tank.

The etching plate 25 may be shifted towards or away from its co-operating cathode depending upon the desired tone of etching to be made upon the plate to be etched as well as depending upon the metal from which said plate 25 to be etched is made.

Obviously, base plate 12, if preferred, may be made of non-conducting material, in which event suitable connecting means could be provided between conductor 14 and plates 15.

While there is described herein a preferred embodiment of the present invention, it is nevertheless to be understood that minor changes may be made therein without departing from the spirit and scope of the invention as claimed.

What I claim as new is:

1. In an electrical etching apparatus, a cathode including a group of relatively small electrodes arranged in co-planar relation, said relatively small electrodes of said group being substantially uniformly spaced apart both vertically and horizontally, and means electrically connecting said electrodes together and adapted to facilitate connection thereof with the negative pole of a source of electricity.

2. In an electrical etching apparatus, a cathode including a group of relatively small similar plate-like electrodes arranged in co-planar edge to edge relation, said relatively small electrodes of said group being substantially uniformly spaced apart both vertically and horizontally, and means electrically connecting said electrodes together and adapted to facilitate connection thereof with the negative pole of a source of electricity.

3. In an electrical etching apparatus, a cathode including a group of relatively small electrodes arranged in co-planar relation, said relatively small electrodes of said group being substantially uniformly spaced apart both vertically and horizontally, a base plate, means supporting said electrodes from said base plate in spaced relation to and in a plane parallel with the latter, and means to facilitate connection of said base plate to the negative pole of a source of electricity.

4. In an electrical etching apparatus, a cathode including a group of relatively small electrodes arranged in co-planar relation, said relatively small electrodes of said group being substantially uniformly spaced apart both vertically and horizontally, means electrically connecting said electrodes together and adapted to facilitate connection thereof with the negative pole of a source of electricity, and means to discharge a plurality of jets of air from said cathode at points between said electrodes and toward a plate to be etched in a direction substantially perpendicular to the plane of said electrodes.

5. In an electrical etching apparatus, a cathode including a group of relatively small electrodes arranged in co-planar relation, said relatively small electrodes of said group being substantially uniformly spaced apart both vertically and horizontally, means electrically connecting said electrodes together and adapted to facilitate connection thereof with the negative pole of a source of electricity, and means to discharge a plurality of jets of air from said cathode between said electrodes and toward a plate to be etched in a direction substantially perpendicular to the plane of electrodes and at points substantially uniformly spaced throughout the area of said cathode.

6. In an electrical etching apparatus, a cathode including a group of relatively small electrodes arranged in co-planar relation and substantially uniformly spaced apart both vertically and horizontally, means electrically connecting said electrodes together and adapted to facilitate connection thereof with the negative pole of a source of electricity, and means to discharge a plurality of jets of air from said cathode at points between said electrodes and toward a plate to be etched in a direction substantially perpendicular to the plane of the latter, said electrodes being arranged in a plurality of rows, said last-named means including air discharge pipes arranged behind said electrodes and running parallel with said rows of the latter.

7. In an electrical etching apparatus, a cathode including a group of relatively small electrodes arranged in co-planar relation and substantially uniformly spaced apart both vertically and horizontally, means electrically connecting said electrodes together and adapted to facilitate connection thereof with the negative pole of a source of electricity, and means to discharge a plurality of jets of air from said cathode at points between said electrodes and toward a plate to be etched in a direction substantially perpendicular to the plane of the latter, said electrodes being arranged in a plurality of rows, said last-named means including air supply manifolds arranged at opposite edges of said cathode and having opposed air discharge pipes projecting therefrom, said air discharge pipes being arranged behind said electrodes and running parallel with said rows of the latter.

JOSEPH HONERT.